(12) United States Patent
Arroyo et al.

(10) Patent No.: US 11,374,619 B2
(45) Date of Patent: Jun. 28, 2022

(54) DATA CABLE TOOL

(71) Applicant: The Boeing Company, Chicago, IL (US)

(72) Inventors: Victor L. Arroyo, Charleston, SC (US); Micah T. Rook, Charleston, SC (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 16/518,572

(22) Filed: Jul. 22, 2019

(65) Prior Publication Data

US 2021/0028822 A1 Jan. 28, 2021

(51) Int. Cl.
*H01R 43/26* (2006.01)
*H04B 3/54* (2006.01)
*F16L 3/015* (2006.01)

(52) U.S. Cl.
CPC ............. *H04B 3/54* (2013.01); *F16L 3/015* (2013.01); *H01R 43/26* (2013.01)

(58) Field of Classification Search
CPC . H04B 3/54; H01R 43/26; F16L 3/015; B25B 9/00; B25B 13/48; Y10T 29/49174; Y10T 29/53209; Y10T 29/53257

USPC .................. 29/857, 747, 750, 758
See application file for complete search history.

(56) References Cited

U.S. PATENT DOCUMENTS

| | | | |
|---|---|---|---|
| 5,146,813 A * | 9/1992 | Stanfill, Jr. | B25B 13/48 81/111 |
| 6,254,418 B1 * | 7/2001 | Tharp | H01R 13/6335 439/352 |
| 6,595,798 B1 * | 7/2003 | Pook | H01R 13/62933 29/764 |
| 2010/0282030 A1 * | 11/2010 | Youtsey | B25B 13/48 29/758 |

* cited by examiner

*Primary Examiner* — Donghai D Nguyen
(74) *Attorney, Agent, or Firm* — Hanley, Flight & Zimmerman, LLC

(57) ABSTRACT

A data cable tool apparatus is disclosed. An example data cable tool apparatus includes a cable carrier having a connector cavity to receive a connector of a cable, and a lever having a tab depressor, pivotally coupled to the cable carrier, to move the tab depressor relative to the connector cavity of the cable carrier.

18 Claims, 8 Drawing Sheets

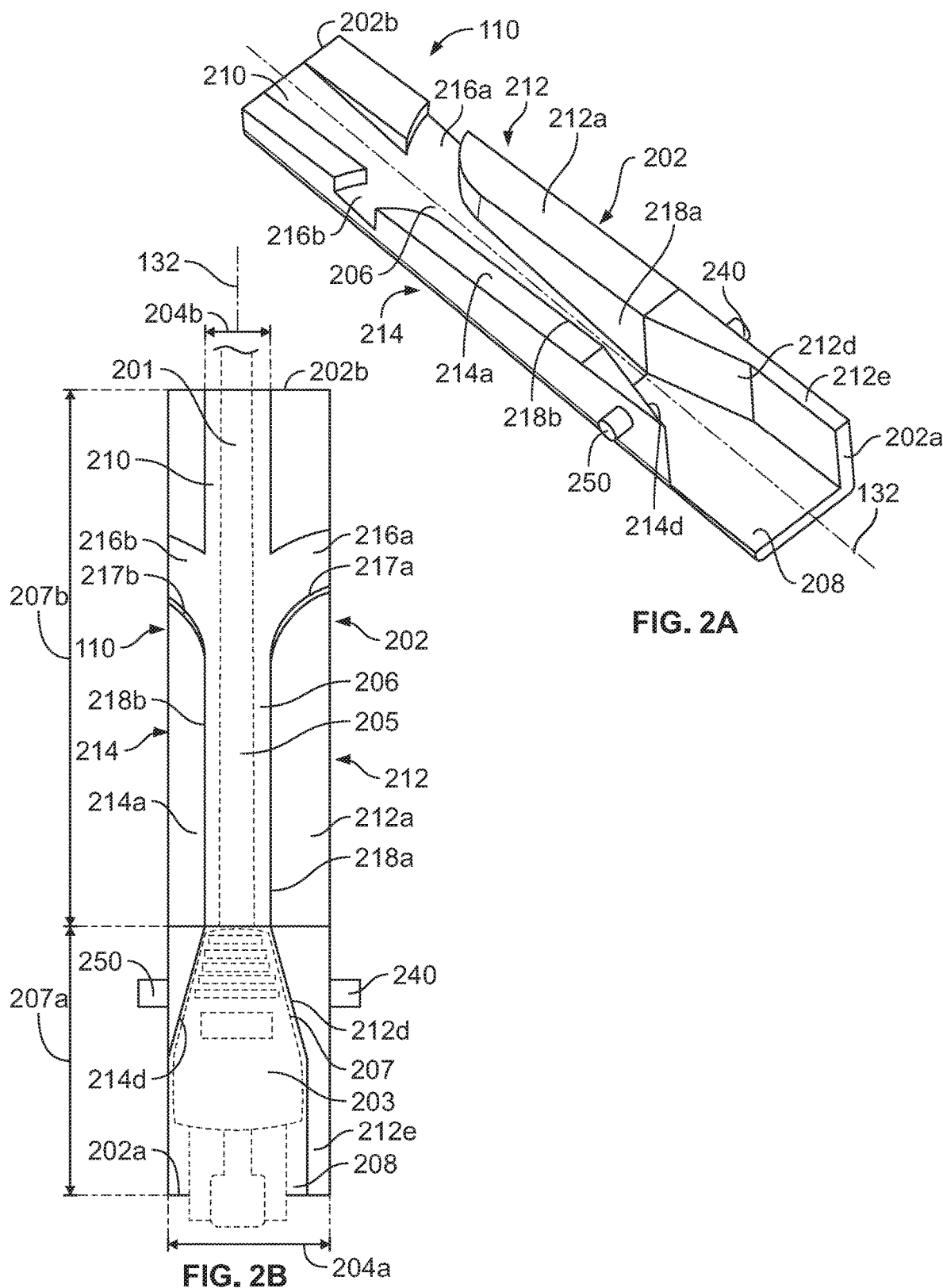

DATA CABLE TOOL

FIELD OF DISCLOSURE

The present disclosure relates generally to tools for cables and, more particularly, to data cable tool.

BACKGROUND

Network cables such as Ethernet data cables removably couple to electronic devices including personal computers, routers, sensors, switches, and data transmission systems (e.g., within a local area network).

SUMMARY

An example apparatus includes a cable carrier having a connector cavity to receive a connector of a cable, and a lever pivotally coupled to the cable carrier to move a tab depressor relative to the connector cavity of the cable carrier.

An example apparatus includes a cable carrier having a connector cavity to receive a connector of a cable and a cord cavity to receive a cord of the cable, and a lever pivotally coupled to the cable carrier and configured to rotate relative to the carrier between a first position to cause a lip of the lever to move in a direction away from the connector cavity and a second position to cause the lip to move toward the connector cavity.

An example apparatus includes means for supporting a cable, the means for supporting the cable having means for receiving a cable connector and means for receiving a cord of the cable, means for depressing a tab of a connector pivotally coupled to the means for supporting the cable, the means for depressing the tab to align with the means for receiving the connector, the means for depressing the tab to move relative the means for supporting the cable between a first position to depress the tab of the connector and a second position to release the tab of the connector, and means for pivotally coupling the means for depressing the tab to the means for supporting the cable.

BRIEF DESCRIPTION OF THE DRAWINGS

FIG. 2A is a perspective view of an example cable carrier of the example data cable tool of FIGS. 1A-1B.

FIG. 2B is a top view of the example cable carrier of FIG. 2A having an example cable coupled thereto.

Wherever possible, the same reference numbers will be used throughout the drawing(s) and accompanying written description to refer to the same or like parts.

DESCRIPTION

Figure 1A:
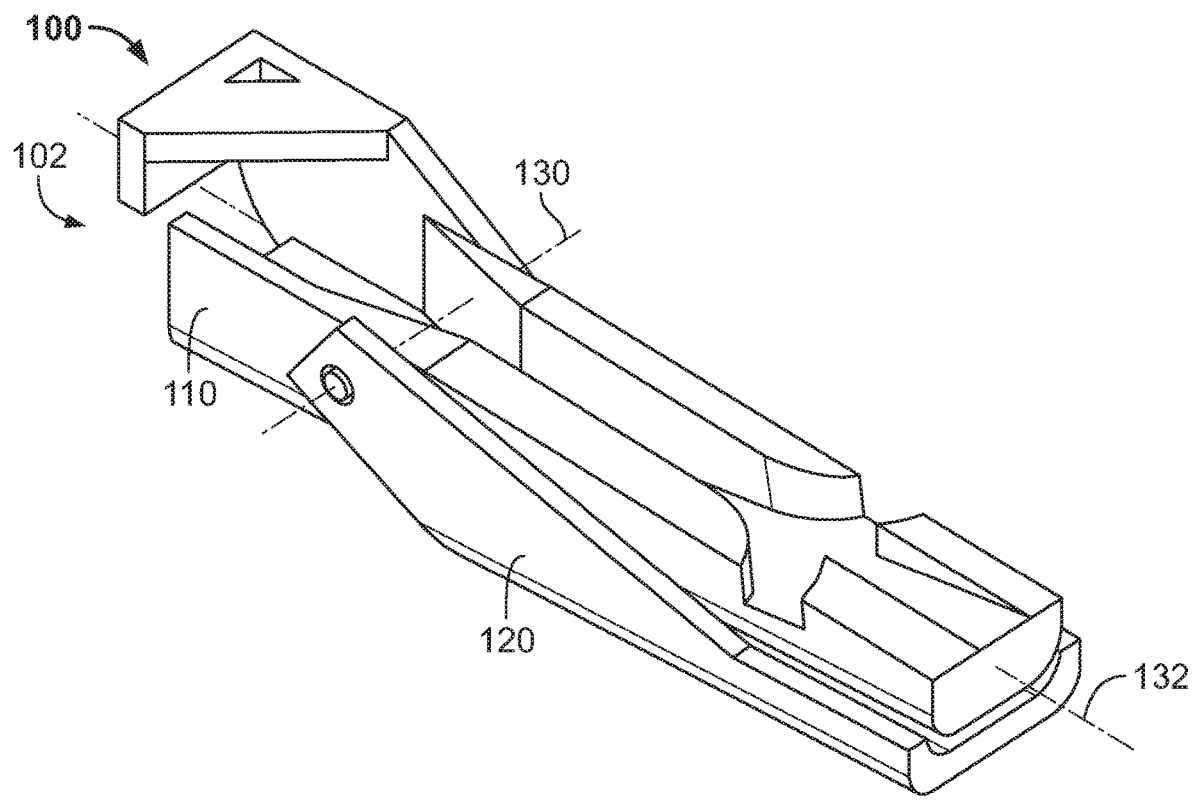
FIG. 1A is a perspective view of an example data cable tool constructed in accordance with the teachings of this disclosure. The example data cable tool of FIG. 1A is shown in an example closed position.

Data cables include a variety of cord lengths and cable connectors (e.g., RJ45 connectors) to couple to ports (e.g., RJ45 jacks) of electronic devices. However, a network data cable can be difficult to insert and/or remove from a cable port (e.g., an RJ45 port) of an electronic device. In particular, the network cable can be difficult to insert and/or remove from a cable port when other network data cables (e.g., plugs or RJ45 connectors) are installed in a side-by-side row configuration on the electronic device (e.g., of a local area network, a server, etc.). In other words, connectors of data cables that are coupled to ports in close proximity and/or adjacent to an open port can impede access to the open port. For example, an open port (e.g., a port or jack of an electronic device that does not have a connector or cable positioned in the port) can be located between adjacent closed ports (e.g., ports or jacks of the electronic device that have connectors or cables coupled thereto). In this instance, the adjacent connectors can impede access to the open port of the electronic device because the ports are spaced in close proximity (e.g., slightly larger than a width of a connector of the cable). Thus, space can be limited to maneuver and/or manipulate the connector and/or a cord of the cable to couple to or decouple the connector from the open port of the electronic device. In some instances, the connector can become damaged when trying to maneuver the connector around the adjacent connectors to couple the connector to an open port. For example, a locking tab of the connector can become damaged. In some examples, a connector can be difficult to couple to an open port when there are no cords present (e.g., coupled) in adjacent ports.

Example data cable tools (e.g., cable plug connect/disconnect apparatus) disclosed herein facilitate coupling (e.g., inserting and/or removing) a cable (e.g., an Ethernet cable) to a cable port (e.g., a jack). As used herein, the term "cable" refers to any data cable, Ethernet cable (e.g., Category 3, Category 5, Category 5e, Category 6, etc.) and/or any other cable that includes a locking tab for securing the data cable to a port of an electronic device, a switch, a wall jack, etc. As used herein, the term "connector" refers to a cable connector (e.g., RJ-45, GG45, etc.) and/or any other connector that includes a locking tab for securing the data cable to a port of an electronic device, a switch, a wall jack, etc.

Example data cable tools disclosed herein facilitate coupling to and/or removal of a cable connector from a port or jack of an electronic device. For example, an example data cable tool disclosed herein enables a user to insert and/or remove a cable plug adjacent, or in close proximity to, a plurality of cables installed in a side-by-side row configuration without interference from adjacent cables. Use of an example cable tool disclosed herein facilitates coupling and/or removing of a data cable and a port (e.g., a jack) of an electronic device, which improves efficiency and reduces the amount of time needed to position a cable connector within a port of the electronic device. In some examples, a cable tool stabilizes a cable cord and/or connector of the cable during insertion and/or removal of the connector relative to the port of the electronic device, thereby preventing damage to the connector cable (e.g., when space is limited adjacent the port of the electronic device). Furthermore, the example cable tools disclosed herein employ tab depressors or lips that enable the user to depress a locking tab of the cable connector when coupling and/or removing the cable from a port of an electronic device, a switch, a wall jack, etc., and/or otherwise secure a locking tab of a connector to prevent damage to the locking tab during the insertion/removal process.

Figure 1B:
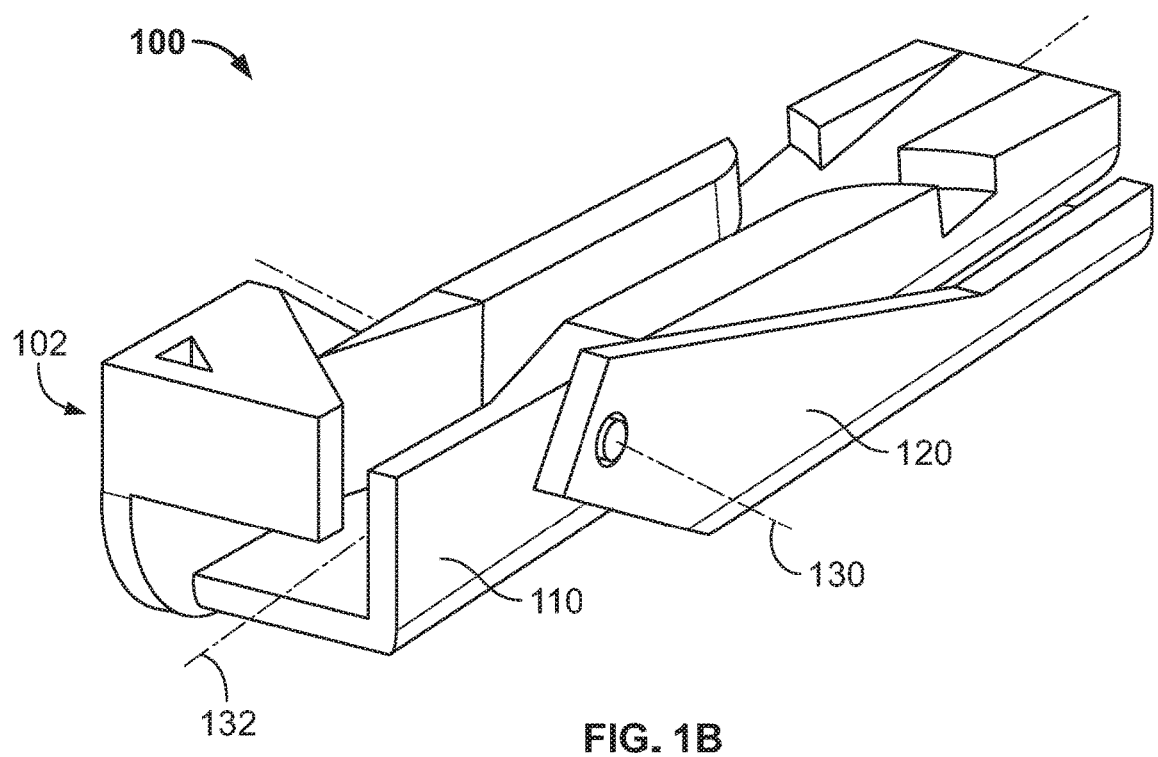
FIG. 1B is another perspective view the example data cable tool of FIG. 1A.

FIG. 1A is a perspective view of an example data cable tool 100 constructed in accordance with the teachings of this disclosure. FIG. 1B is another perspective view of the example data cable tool 100 of FIG. 1A. The data cable tool 100 of FIG. 1A is shown in an example closed position 102. The example data cable tool 100 includes a cable carrier 110 and a lever 120 pivotally coupled to the cable carrier 110 about a pivot axis 130. The pivot axis 130 is non-parallel (e.g., perpendicular) relative to a longitudinal axis 132 of the data cable tool 100. As described in greater detail below, the lever 120 moves relative to the cable carrier 110 to couple and/or decouple a cable connector from a port of an electronic device.

FIG. 2A is a top perspective view of the cable carrier 110 of FIGS. 1A and 1B. FIG. 2B is a top view of the example cable carrier 110 of FIG. 2A. Referring to FIGS. 2A-2B, the cable carrier 110 of the illustrated example includes a body 202 that is configured to receive an example cable 201 (e.g., shown in dashed line). Specifically, the cable carrier body 202 defines a connector cavity 208 and a cord cavity 210. The connector cavity 208 of the illustrated example receives a cable connector 203 of the cable 201 and the cord cavity 210 receives a cable cord 205 of the cable 201. In other words, the cable carrier 110 is configured (e.g., has a shape or profile) to receive both the cable cord 205 and the cable connector 203 via the cord cavity 210 and the connector cavity 208. However, in some examples, the cable carrier 110 can be configured to receive only the cable connector 203. To define the connector cavity 208 and the cord cavity 210, the cable carrier body 202 of the illustrated example includes a slot 206. The slot 206 of the cable carrier 110 is formed along the longitudinal axis 132 between a first end 202a of the body 202 and a second end 202b of the cable carrier body 202 opposite the first end 202a. Specifically, the connector cavity 208 is located at or adjacent (e.g., proximate to) the first end 202a of the cable carrier body 202 (e.g., between the first end 202a and the cord cavity 210) and the cord cavity 210 extends between the connector cavity 208 and the second end 202b of the cable carrier body 202. In some examples, the cable carrier 110 provides means for supporting a cable.

To receive the cable connector 203, the connector cavity 208 has a first width 204a. To receive the cable cord 205, the cord cavity 210 has a second width 204b. The first width 204a of the illustrated example is greater than the second width 204b (e.g., by approximately between 25% and 75%). The first width 204a transitions to the second width 204b, the transition having a varying third width between the connector cavity 208 and the cord cavity 210. Additionally, the connector cavity 208 has a first length 207a and the cord cavity 210 has a second length 207b. The first length 207a of the illustrated example is smaller than (e.g., between approximately 15% and 50% (e.g., 30%) smaller than) the second length 207b.

The cable carrier body 202 includes a first side 212 and a second side 214 opposite the first side 212. The first side 212 includes a first side wall 212a and the second side 214 includes a second side wall 214a opposite the first side wall 212a. The connector cavity 208 and the cord cavity 210 are formed between the first side wall 212a and the second side wall 214a. The first side wall 212a and the second side wall 214a support, guide, or otherwise surround the cable cord 205 when the cable 201 is positioned in the cord cavity 210 and/or the cable connector 203 when the cable connector 203 is positioned in the connector cavity 208. The cable cord 205 can be positioned along the slot and exits the second end 202b of the cable carrier 110 via the slot 206. Alternatively, the first side wall 212a and the second side wall 214a include respective first and second lever openings 216a, 216b to receive a portion (e.g., a rear portion) of the cable cord 205 when the cable cord 205 is positioned in the cord cavity 210. To allow flexibility in positioning the cord during insertion into, or removal from, a cable port, the lever first and second openings 216a, 216b permit placement or orientation of a portion (e.g., a rear portion) the cable cord 205 toward (e.g., to exit) the first side 212 of the cable carrier 110 or the second side 214 of the cable carrier 110, respectively. First and second walls 217a, 217b bordering the first and second lever openings 216a, 216b are curved (e.g., curved sections of the first side wall 212a and the second side wall 214a) to allow improved fit of the cable cord 205 through the first and second lever openings 216a, 216b. In some examples, the openings 216a, 216b are non-parallel (e.g., perpendicular, an angle between approximately 10 degrees and 90 degrees) relative to the longitudinal axis 132 of the cable carrier 110. In some examples, the cable carrier 110 does not include the lever openings 216a, 216b.

The first side wall 212a includes a first wall section 218a and the second side wall 214a includes a second wall section 218b. The first wall section 218a and the second wall section 218b are tapered between the first end 202a and the second end 202b to provide an increase in wall height directed towards the cable connector cavity 208. The tapered first wall section 218a and second wall section 218b provide increased stability of the cable cord 205 within the cord cavity 210. In some examples, the first wall section 218a and the second wall section 218b are not tapered and/or provide a uniform height along the longitudinal axis 132.

The connector cavity 208 of the illustrated example is configured to retain the cable connector 203 with a relatively tight-fit when the cable connector 203 is positioned within the connector cavity 208. To enable the connector cavity 208 to retain the cable connector 203 with a relatively tight fit, the first side wall 212a and the second side wall 214a of the illustrated example include respective wall transitions 212d and 214d. The wall transitions 212d and 214d have tapered profiles that taper outwardly from the cord cavity 210 toward the connector cavity 208. Thus, the wall transitions 212d and 214d increase from the second width 204b adjacent the cord cavity 210 to the first width 204a of the connector cavity 208 adjacent the first end 202a of the cable carrier body 202. The wall transitions 212d and 214d of the illustrated example are complementary to a shape of the cable connector 203. For example, the wall transitions 212d and 214d are tapered substantially similar (e.g., within between 1% and 5% relative) to a tapered profile 207 of the cable connector 203. In this example, the first side wall 212a includes a border wall 212e that extends from the wall transition 212d to border or enclose a side of the cable connector 203. The second side wall 214a does not include a border wall (e.g., the border wall 212e) and forms an opening adjacent the first end 202a of the cable carrier body 202. In some examples, the second side wall 214a includes a border wall (e.g., similar to the first wall 212a to enclose the connector cavity 208). In some examples, the connector cavity 208 provides means for receiving a connector. In some examples, the tapered wall transitions 212d, 214d provide means for retaining the connector 203.

Additionally, to pivotally couple the lever 120 and the cable carrier 110, the cable carrier 110 includes a first post 240 and a second post 250. The first post 240 is provided on the first side 212 of the cable carrier body 202 and the second post 250 is provided on the second side 214. In this example, the first post 240 projects from the first side wall 212a and the second post 250 projects from the second side wall 214a. The first post 240 and the second post 250 project from the respective first side wall 212a and the second side wall 214a in a direction non-parallel (e.g., perpendicular) to the longitudinal axis 132 of the cable carrier 110 and in directions away from the cable carrier 110 and/or the longitudinal axis 132. In some examples, the first and second posts 240, 250 provide means for pivotally coupling the lever 120 and the cable carrier 110.

Figure 3A:
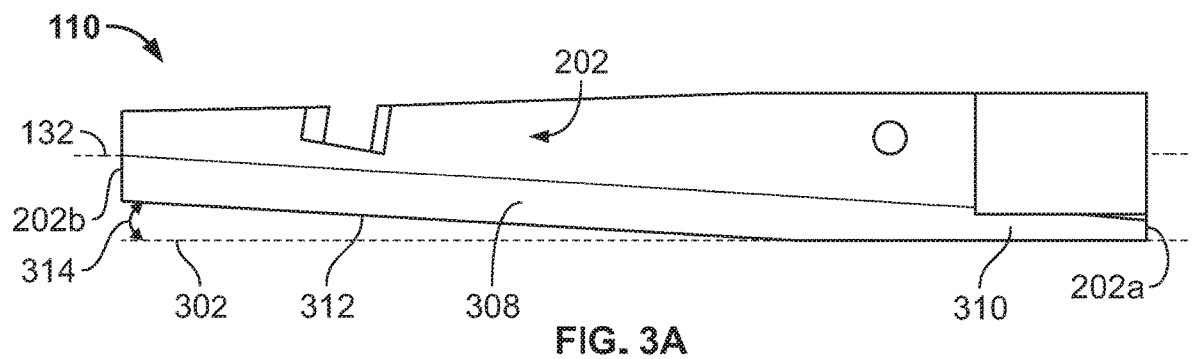
FIG. 3A is a side view of the example cable carrier of FIGS. 1A-1B and 2A-2B.
Figure 3B:
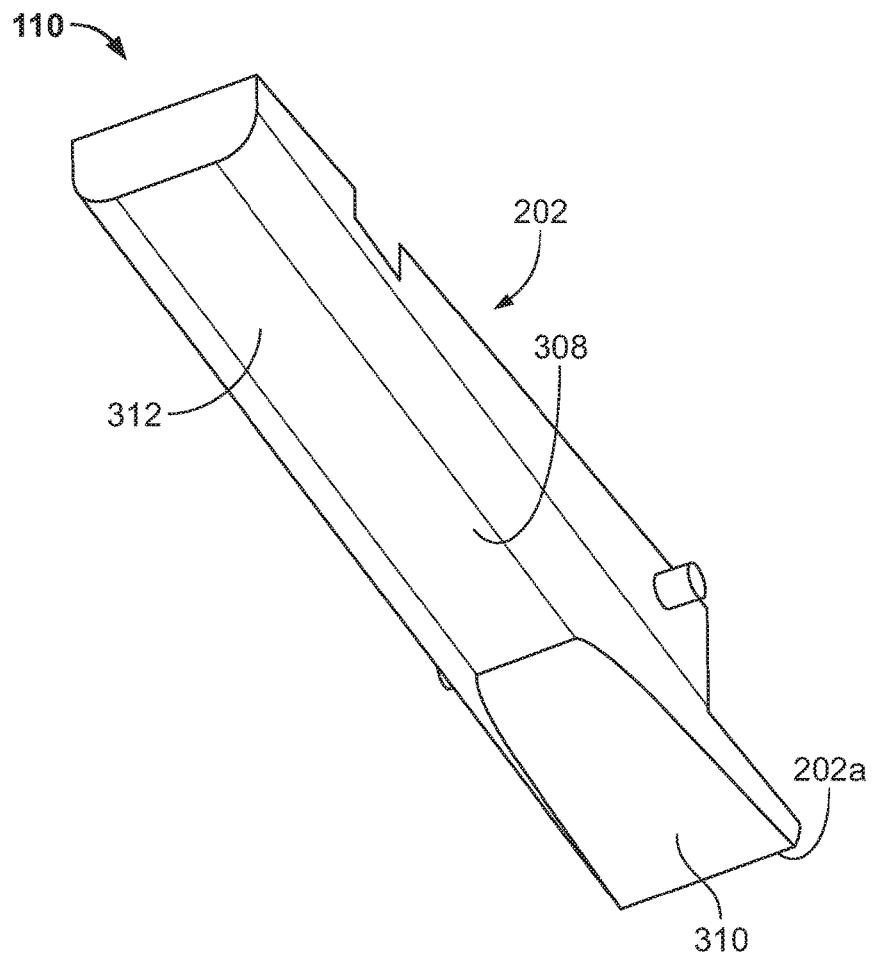
FIG. 3B is a perspective, bottom view the example cable carrier of FIGS. 1A-1B, 2A-2B and 3A.

FIG. 3A is a side view of the example cable carrier 110 of FIGS. 1A-1B and 2A-2B. FIG. 3B is a perspective bottom view of the example cable carrier 110 of FIGS. 1A-1B and 2A-2B. The cable carrier body 202 (e.g., a bottom surface 308 of the body 202) of the example cable carrier 110 tapers (e.g., reduces in thickness) from the first end 202a of the cable carrier body 202 to the second end 202b of the cable carrier body 202. Specifically, the bottom surface 308 of the cable carrier body 202 tapers along a portion of the cable carrier body 202 defining the cord cavity 210. In other words, the bottom surface 308 of the cable carrier body 202 has a first portion 310 having a non-tapered surface (e.g., a flat surface) and a second portion 312 having an angled or tapered surface. For example, the angled surface of the second portion 312 can have an angle 314 of approximately between 5 degrees and 40 degrees from plane 302 (e.g., coplanar to the flat first portion 310). In this manner, the angled surface of the second portion 312 enables a greater degree of rotation of the lever 120 relative to the cable carrier 110.

Figure 4A:
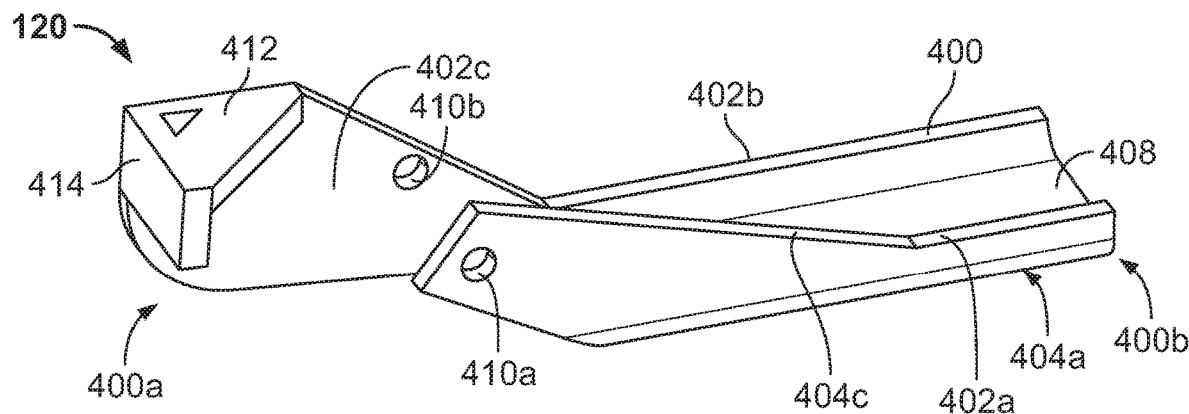
FIG. 4A is a perspective, side view of an example lever of the example data cable tool of FIGS. 1A-1B.
Figure 4B:
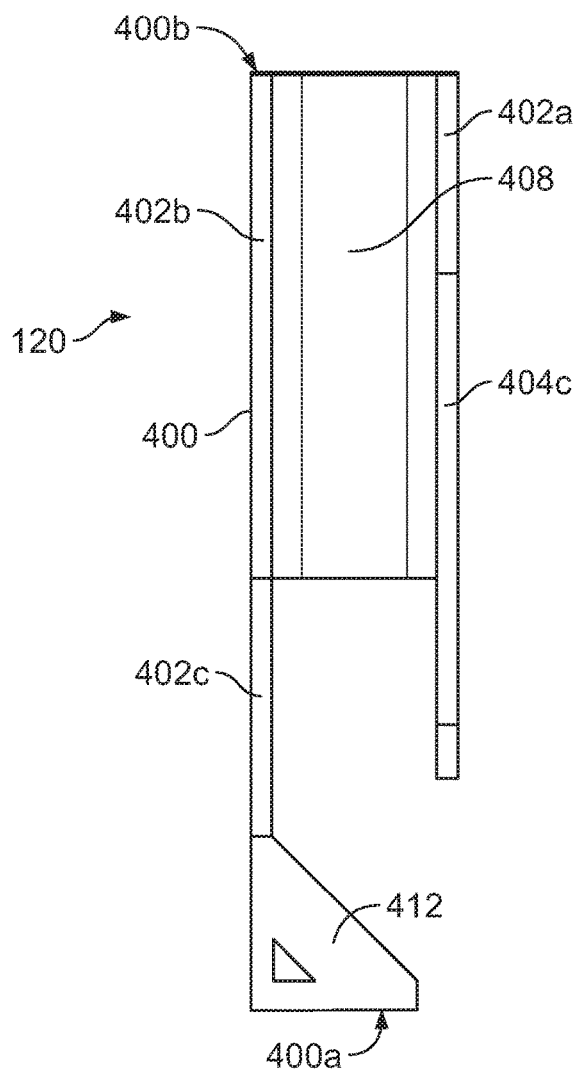
FIG. 4B is a top view of the example lever of FIGS. 1A-1B and 4A.

FIG. 4A is a perspective, side view of an example lever 120 of FIGS. 1A-1B. FIG. 4B is a top view of an example lever 120 of FIGS. 1A-1B and 4A. The lever 120 includes a lever body 400 having a first end 400a and a second end 400b positioned opposite the first end 400a. The first end 400a of the lever body 400 defines a tab depressor 412. The tab depressor 412 extends from a support wall 402c of the lever body 400. The tab depressor 412 includes a lip 414. For example, the lip 414 is an extension of the tab depressor 412. In some examples, the lever 120 provides means for depressing a tab of the connector 203.

To enable a user to grasp the lever 120 to pivot the lever 120 relative to the cable carrier 110, the lever 120 of the illustrated example includes a handle 404a. The handle 404a of the illustrated example is defined by (e.g., integrally formed with) the second end 400b of the lever body 400. The lever 120 (e.g., adjacent the handle 404a) includes a cavity 408 to receive the cable carrier 110. To define the cavity 408, the lever 120 of the illustrated example include a first lever wall 402a and a second lever wall 402b. Additionally, the lever 120 includes the support wall 402c and a tapered wall 404c.

To pivotally couple the lever 120 to the cable carrier 110, the lever 120 of the illustrated example includes a first opening 410a and a second opening 410b. For example, the first opening 410a receives the first post 240 of the cable carrier 110 and the second opening 410b receives the second post 250 of the cable carrier 110. The first opening 410a is formed in the tapered wall 404c and the second opening 410b is formed in the support wall 402c. The first opening 410a and the second opening 410b are coaxially aligned and are non-parallel (e.g., perpendicular) relative to the longitudinal axis 132. However, in some examples, the first opening 410a and the second opening 410b have longitudinal axes that are offset relative to each other and/or are non-parallel and non-perpendicular relative to the longitudinal axis 132. In some examples, the lever 120, the cable carrier 110, the first and second posts 240, 250 and/or the first and second openings 410a, 410b include one or more biasing elements (e.g., leaf spring, coil spring, a torsion spring, etc.). For example, the biasing element can be employed to bias the lever 120 in a first position (e.g., the closed position 102, an open position 700 of FIG. 7A. In some examples, the lever 110 and/or the cable carrier 120 can employ one or more bushings to facilitate rotation of the lever 110 relative to the cable carrier 120.

Figure 5A:
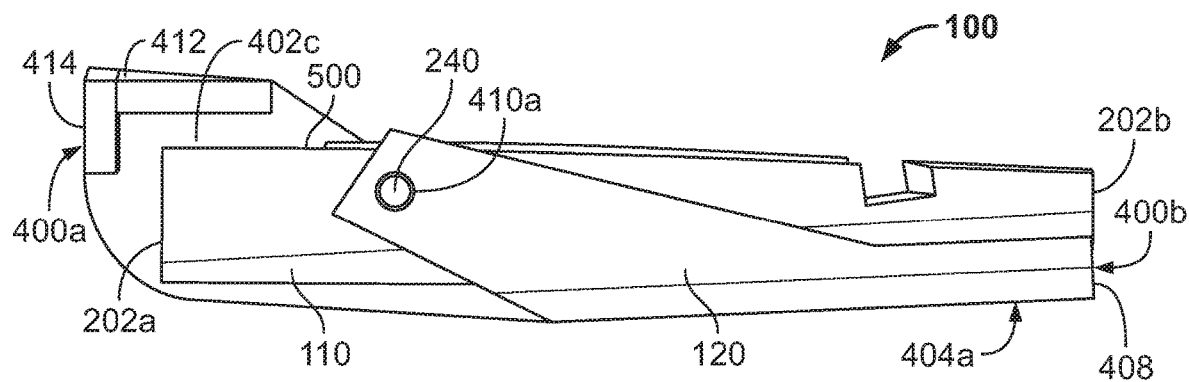
FIG. 5A is a right side view of the example data cable tool of FIGS. 1A-1B.
Figure 5B:
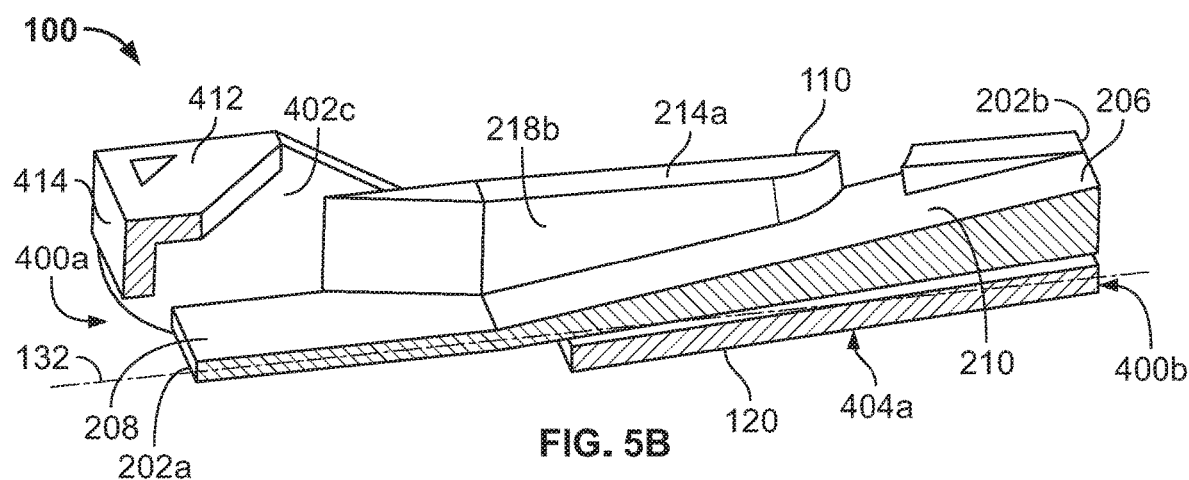
FIG. 5B is a perspective, cross-sectional view of the example data cable tool of FIGS. 1A-1B.
Figure 5C:
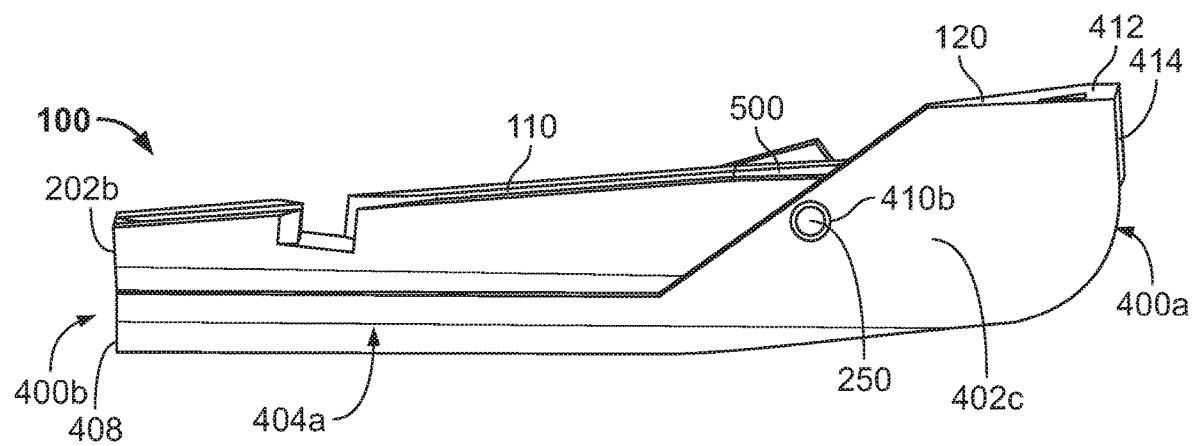
FIG. 5C is a left side view of the example data cable tool of FIGS. 1A-1B.

FIG. 5A is a right side view of the example data cable tool 100 of FIGS. 1A-1B shown in the closed position 102. FIG. 5B is a perspective, cross-sectional view of the example data cable tool 100 of FIGS. 1A-1B. FIG. 5C is a left side view of the example data cable tool of FIGS. 1A-1B.

Referring to FIGS. 5A-5C, the lever 120 is pivotally coupled to the cable carrier 110 via the first post 240 and the second post 250 and the first opening 410a and the second opening 410b. When the lever 120 is coupled to the cable carrier 110, the handle 404a extends along the bottom surface 308 of the cable carrier 110 and the tab depressor 412 extends above an upper surface 500 of the cable carrier 110. Specifically, in the closed position 102, the tab depressor 412 of the lever 120 is positioned in alignment with (e.g., above) the connector cavity 208 of the cable carrier 110 and the second end 202b of the cable carrier 110 nests within the cavity 408 defined by the example handle 404a or the second end 400b of the lever 120. The support wall 402c encloses at least a portion of the connector cavity 208 of the cable carrier 110 when the data cable tool 100 is in the closed position 102 (FIGS. 1A and 1B). In some examples, the tab depressor 412 and/or the lip 414 provide means for depressing the tab.

Referring to FIG. 5B, to help retain the cable connector 203 in the connector cavity 208, the cord cavity 210 tapers (e.g., slopes) downwardly from the second end 202b of the cable carrier body 202 towards the connector cavity 208. For example, a cross-section of the cable carrier body 202 (e.g., taken along the longitudinal axis 132 or the slot 206) is greater (e.g., thicker) at the second end 202b of the cable carrier body 202 of the cable carrier 110 relative to a cross-section of the cable carrier body 202 of the cable carrier 110 positioned at the first end 202a of the cable carrier body 202 opposite the second end 202b. The lever handle 404a, positioned directly underneath the second end 202b of the cable carrier 110 when the data cable tool 100 is in the closed position 102, is consistent in cross-sectional thickness. However, in some examples, the lever handle 404a can vary in cross-section.

Figure 6A:
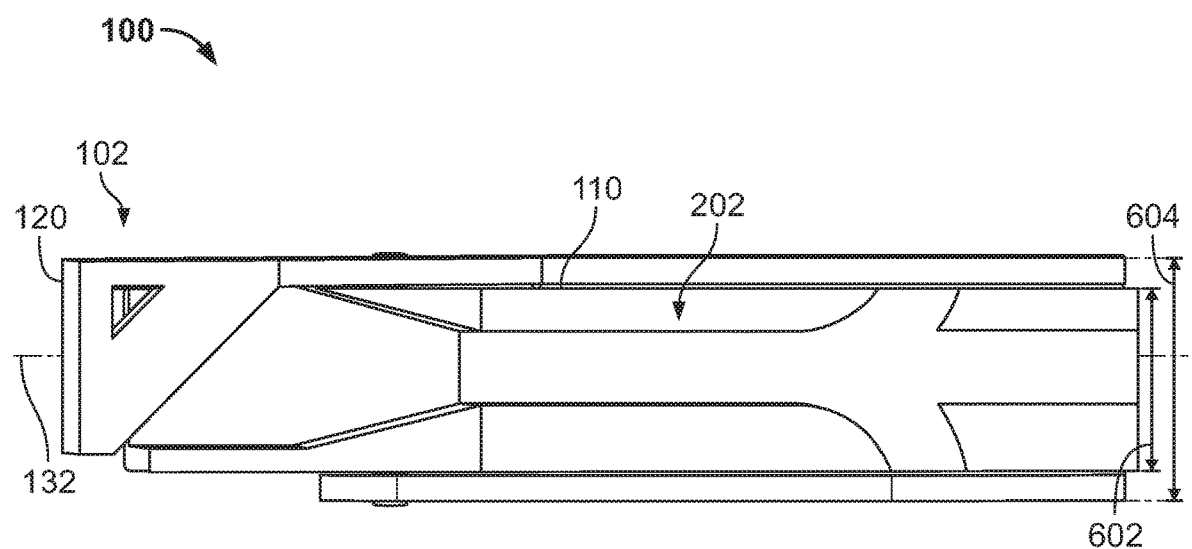
FIG. 6A is a top view of the example data cable tool of FIGS. 1A-1B.
Figure 6B:
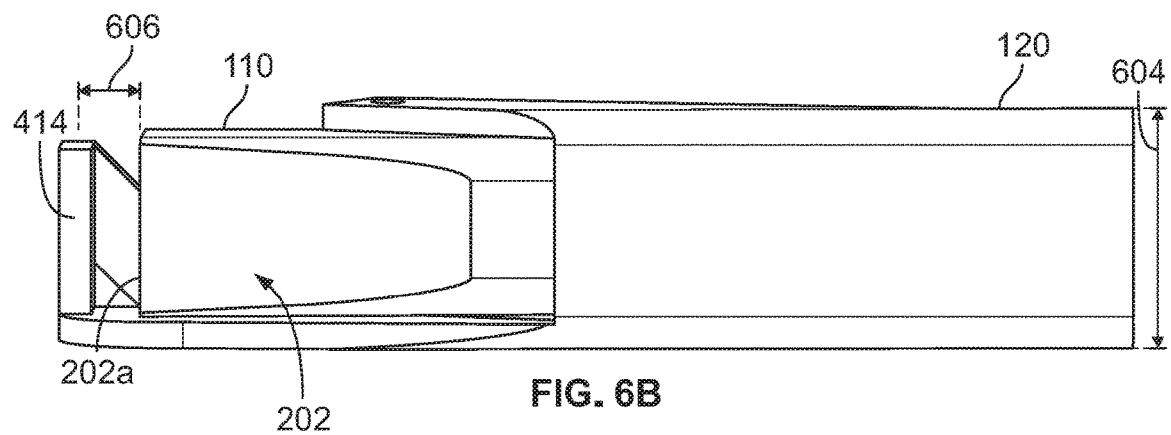
FIG. 6B is a bottom view of the example data cable tool of FIGS. 1A-1B.

FIG. 6A is a top view of the example data cable tool 100 of FIGS. 1A-1B and 5A-5C. FIG. 6B is a bottom view of the example data cable tool 100 of FIGS. 1A-1B and 5A-5C. The data cable tool 100 is in the closed position 102. To allow the cable carrier 110 to fit within the cavity 408 of the lever 120 when the data cable tool 100 is in the closed position 102, the cable carrier body 202 has a first width 602 that is smaller (e.g., narrower) than a second width 604 of the cavity 408 of the lever 120. Furthermore, the tab depressor 412 and/or the lip 414 extends from the support wall 402c relative to the first end 202a of the cable carrier body 202 by a length or distance 606. For example, the distance 606 between the lip 414 and the first end 202a of the cable carrier body 202 can be approximately between 0.25-1.5 inches (e.g., 6-38 mm).

Figure 7A:
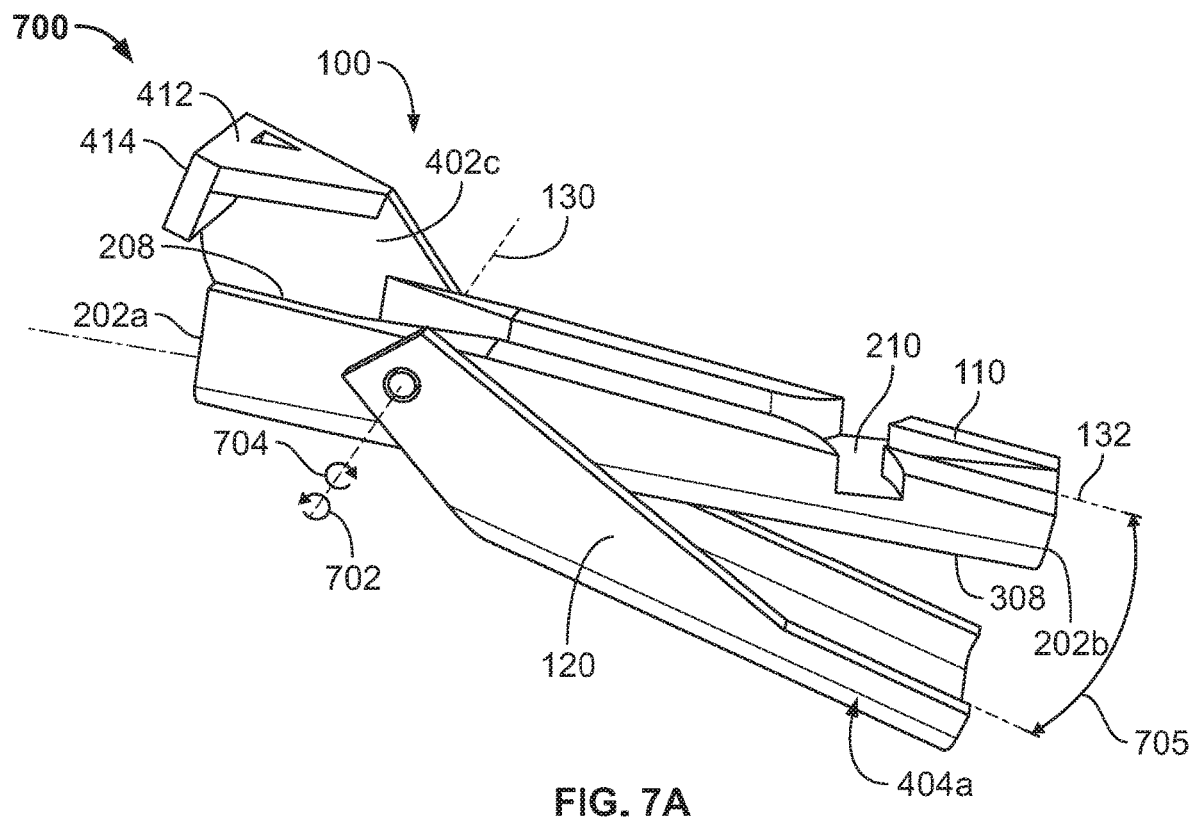
FIG. 7A is a perspective view of the example data cable tool of FIGS. 1A-1B shown in an example open position.
Figure 7B:
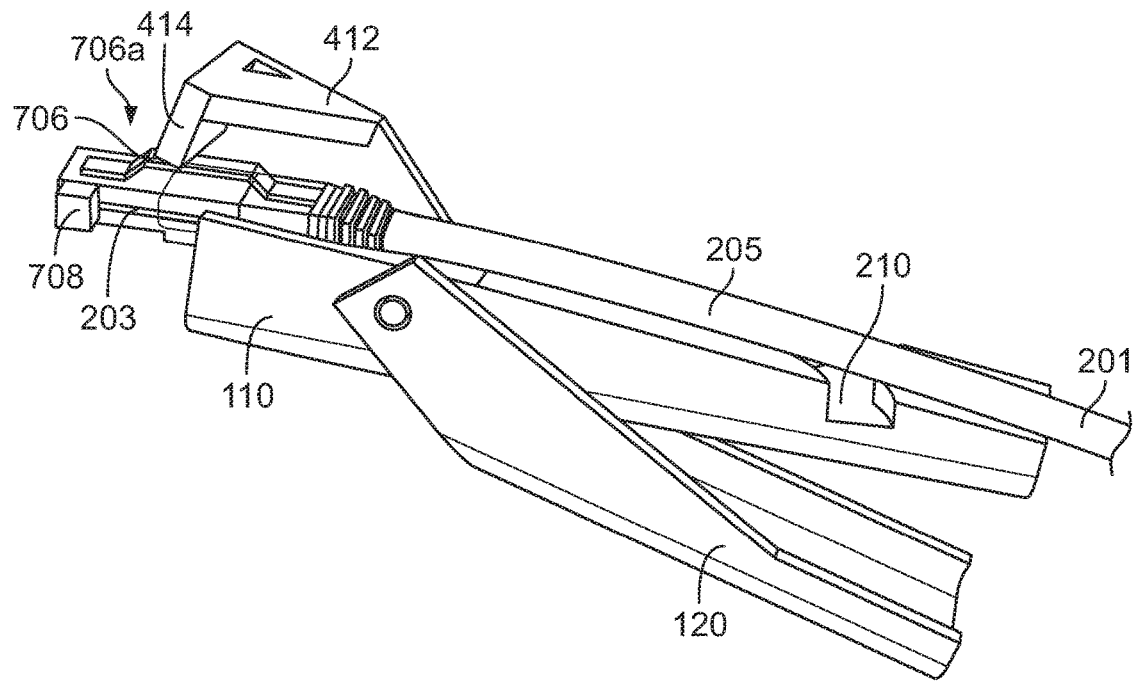
FIG. 7B is a perspective view of the example data cable tool of FIGS. 1A-1B in the example open position and having an example cable coupled thereto.

FIG. 7A is a perspective view of the example data cable tool 100 of FIGS. 1A-1B and 5A-5C shown in an example open position 700 (e.g., a first position). FIG. 7B is a perspective view of the example data cable tool 100 of FIGS. 1A-1B and 5A-5C shown in the example open position 700 and having the example cable 201 positioned within the example cable carrier 110. To move the data cable tool 100 to the open position 700, the lever 120 rotates about the pivot axis 130 in a first rotational direction 704 (e.g., a clockwise direction in the orientation of FIG. 7A). Specifically, rotation of the lever 120 in the first rotational direction 704 causes the handle 404a of the lever 120 and the lip 414 of the lever 120 to move in a direction away from the cable carrier 110. For example, in the open position 700, the handle 404a is rotated away from the second end 202b of the cable carrier body 202 and the tab depressor 412 (e.g., the lip 414) is positioned away from the first end 202a of the cable carrier body 202 and/or the connector cavity 208. In other words, the lever 120 increases an angle 705 between the lever 120 and the longitudinal axis 132 (e.g., the bottom surface 308). Conversely, to move the data cable tool 100 to the closed position (e.g., second position) 102, the lever 120 rotates about the pivot axis 130 in a second rotational direction 702 (e.g., a counter-clockwise direction in the orientation of FIG. 7A). Rotation of the lever 120 about the pivot axis 130 in the second rotational direction 702 causes the handle 404a of the lever 120 and the lip 414 of the lever 120 to move in a direction towards the cable carrier 110. For example, in the closed position 102, the handle 404a is rotated toward the second end 202b of the cable carrier body 202 and the tab depressor 412 (e.g., the lip 414) is positioned toward the first end 202a of the cable carrier body 202 and/or the connector cavity 208. In other words, the lever 120 decreases the angle 705 between the lever 120 and the longitudinal axis 132 (e.g., the bottom surface 308).

When the cable cord 205 is nested within the cord cavity 210 and the cable connector 203 is nested within the connector cavity 208, movement of the data cable tool 100 to the closed position 102 causes the tab depressor 412 (e.g., via the lip 414) to move towards the cable connector 203. In response to movement of the lever 120 toward the cable carrier 110 (e.g., the closed position 102), the lip 414 moves or depresses a cable connector tab 706 of the cable connector 203 located in the connector cavity 208 to a depressed position (706a).

Conversely, in response to movement of the lever 120 the open position 700, the tab depressor 412 moves away from the cable connector 203 and the lip 414 releases the cable connector tab 706. The cable connector tab 706 has resilient characteristics that enable the cable connector tab 706 to return to a non-depressed position (e.g., an initial position). In some examples, at least a portion of the tab depressor 412 (e.g., the lip 414) that is to contact the cable connector tab 706 can include a material (e.g., a rubber, a grip, adhesive, etc.) to increase friction between the tab depressor 412 and the cable connector tab 706. In some examples, the cable carrier 110 (e.g. the connector cavity 208 and/or the cord cavity 210) can include material (e.g., a rubber, a grip, adhesive, etc.) to increase friction and/or help retain the cable 201 in the slot 206. As shown in FIG. 7B, a portion 708 of the cable connector 203 extends or protrudes from (e.g., extends past the first end of) the tab depressor 412 and/or the data cable tool 100 to enable the cable connector 203 to be inserted in a port of an electronic device when the data cable tool 100 is in the closed position 102.

Figure 8:
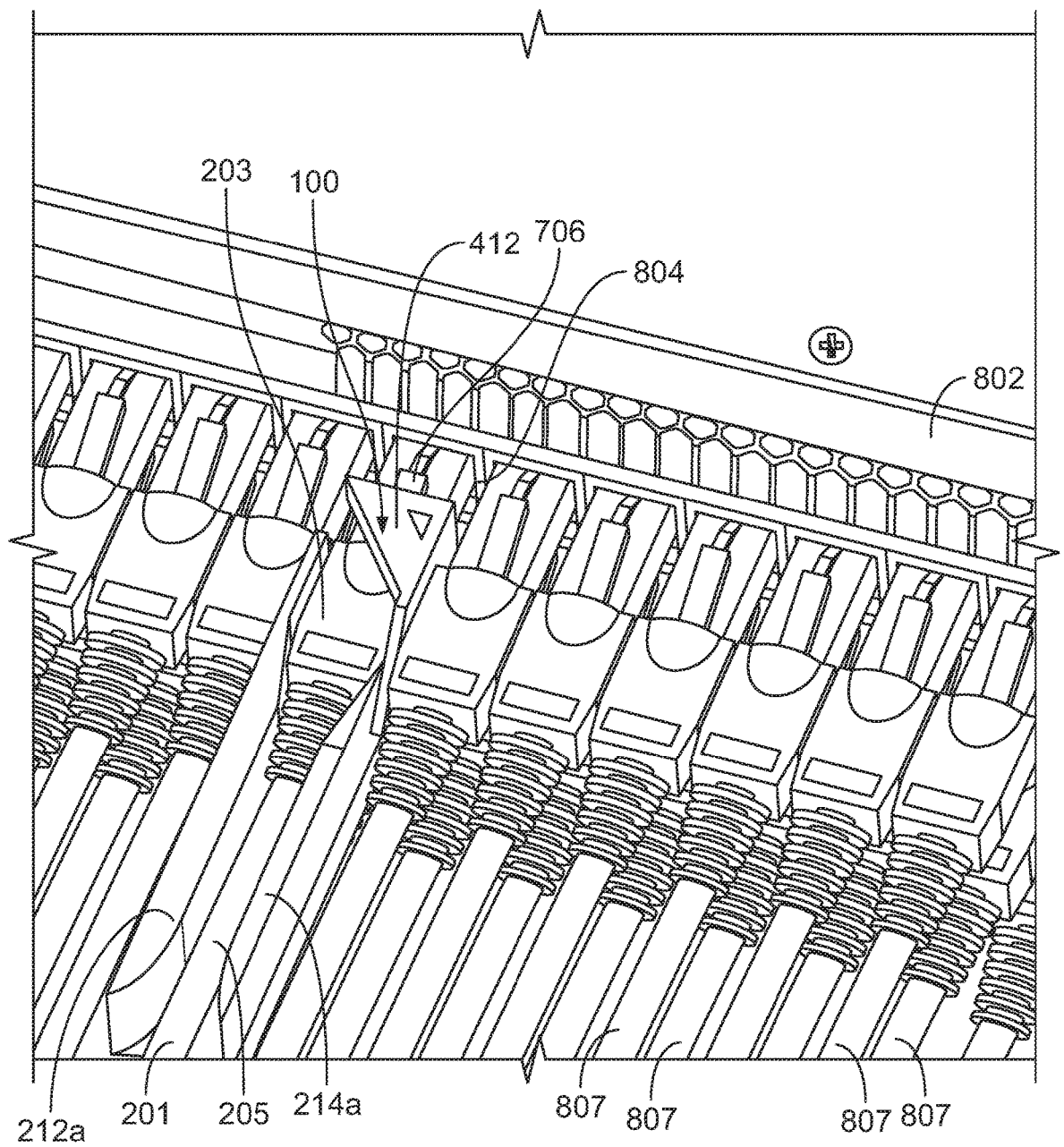
FIG. 8 is a perspective view of the example data cable tool of FIGS. 1A-1B used to couple the example cable of FIG. 7B to an example port of an example electric device having a plurality of cables coupled to the electronic device in a side-by-side row configuration.

FIG. 8 is an illustration of the example data cable tool 100 of FIGS. 1A-1B, 5A-5C, 6A-6B and 7A-7B used to couple the example cable 201 of FIG. 7B to an example port 804 of an example electronic device 802. The electronic device 802 has a plurality of cables 807 coupled to the electronic device 802 in a side-by-side row configuration. The data cable tool 100 can be employed to couple the cable 201 to the port 804 and/or remove the cable 201 relative to the port 804. For example, the data cable tool 100 can be employed to attain greater control of the cable 201 during the insertion or removal process of the cable 201 from the example port 804 of the electronic device 802. During the insertion, the data cable tool 100 is moved to the open position 700 and the cable 201 is coupled to the cable carrier 110 such that the cable connector 203 is positioned in the connector cavity 208 and the cable cord 205 is positioned in the cord cavity 210. For example, with the data cable tool 100 in the open position 700, the data cable tool 100 can be slid along the cable cord 205 (e.g., the cable cord 205 can be positioned to extend through the connector cavity 208) until the cable connector 203 is received in the connector cavity 208. After the cable connector 203 is positioned or nested within the connector cavity 208, the lever 120 is rotated about the pivot axis 130 in the first rotational direction 704 to move the data cable tool 100 to the closed position 102 to cause the tab depressor 412 to depress the locking tab (e.g., cable connector tab 706) of the cable connector 203 (e.g., via the lip 414). With the data cable tool 100 in the closed position 102 and the cable connector tab 706 of the cable connector 203 depressed, the data cable tool 100 is used to insert the cable 201 in the port 804 of the electronic device 802. As noted above, at least the portion 708 of the cable connector 203 protrudes from the data cable tool 100 such that the data cable tool 100 does not interfere with insertion of the cable 201 into the port 804. After the portion 708 of the cable connector 203 protruding from the data cable tool 100 is inserted into the port 804, the lever 120 is rotated about the pivot axis 130 to move the data cable tool 100 to the open position 700 to cause the tab depressor 412 to release the cable connector tab 706 of the cable connector 203. As a result, the cable connector tab 706 returns to an initial state or a non-depressed state and engages a lock of the port 804 to retain the cable connector 203 in the port 804. With the data cable tool 100 in the open position 700, the data cable tool 100 is moved away from the cable connector 203 and the cable cord 205 (e.g., the cable 201). For example, the data cable tool 100 is slid away from the cable connector 203 along the cable cord 205.

To remove the cable 201 from the port 804 of the electronic device 802, the data cable tool 100 is moved to the open position 700 and maneuvered such that the cable connector 203 is retained in the connector cavity 208 and the cable cord 205 is positioned within the cord cavity 210. For example, the data cable tool 100 can be slid along the cable cord 205 (e.g., the cable cord 205 can be positioned to extend through the connector cavity 208) until the cable connector 203 is positioned or nested within the connector cavity 208. With the cable connector 203 positioned in the connector cavity 208, the lever 120 is rotated in the second rotational direction 702 about the pivot axis 130 to cause the tab depressor 412 to depress the locking tab of the cable connector 203 to unlock the cable connector tab 706 from the port 804 and enable removal of the cable connector 203 from the port 804. With the cable connector tab 706 in a depressed state and the data cable tool 100 in the closed position 102, the data cable tool 100 can be pulled in a direction away from the electronic device 802 to cause the cable connector 203 to remove or decouple from the port 804. The data cable tool 100 can be used to insert and/or remove a variety of different cable connectors into a cable port, provided that the data cable tool 100 includes a connector cavity (e.g., connector cavity 208) and a cord cavity (e.g., cord cavity 210) configured to fit the variety of different types of cables. The cable carrier can be modified based on the cable parameters. For example, the length of the cable carrier can vary depending on the type of cable cord and cable connector (e.g., cord thickness, connector size) the example cable plug connect/disconnect apparatus is designed to support. In some examples, the cord cavity 210 provides means for receiving the cord 205 of the cable 201.

From the foregoing, it will be appreciated that example cable tool is structured to allow a user greater control over the insertion and/or removal process of a cable from a cable port. The example cable tool provides a tight-fit connection between a cable connector within a connector cavity of the cable tool apparatus and/or between a cord of a cable and a cord cavity of the cable tool apparatus. By stabilizing the cable (e.g., a connector) via the example cable tool apparatus disclosed herein, a user can insert and/or remove a cable more easily and/or accurately.

In some examples, the apparatus includes a cable carrier having a connector cavity to receive a connector of a cable, and a lever pivotally coupled to the cable carrier to move a tab depressor relative to the connector cavity of the cable carrier.

In some examples, the lever includes a body defining the tab depressor at a first end of the body and a handle at a second end of the body opposite the first end.

In some examples, the handle extends along a bottom surface of the cable carrier and the tab depressor extends above an upper surface of the cable carrier.

In some examples, the tab depressor includes a lip positioned in alignment with the connector cavity of the carrier.

In some examples, the cable carrier includes a tapered wall adjacent the connector cavity structured to engage at least a portion of the connector when the connector is positioned in the connector cavity.

In some examples, the cable carrier includes a slot to define the connector cavity.

In some examples, the slot further defines a cord cavity to receive a cord of the cable.

In some examples, the slot includes a first width defining the connector cavity, a second width defining the cord cavity, and a transition having a varying third width between the connector cavity and the cord cavity, the first width being greater than the second width.

In some examples, the slot is formed along a longitudinal axis of the carrier.

In some examples, a first side wall and a second side wall of the cable carrier include openings to receive the cord of the cable, the openings being non-parallel relative to the longitudinal axis of the carrier.

In some examples, the apparatus includes a cable carrier having a connector cavity to receive a connector of a cable and a cord cavity to receive a cord of the cable, and a lever pivotally coupled to the cable carrier and configured to rotate relative to the carrier between a first position to cause a lip of the lever to move in a direction away from the connector cavity and a second position to cause the lip to move toward the connector cavity.

In some examples, the lever has a first portion including a handle extending underneath the cable carrier and a second portion including the lip extending above the cable carrier.

In some examples, the lip extends from a support wall that encloses at least a portion of the connector cavity.

In some examples, the lip is to move a tab of the connector located in the connector cavity to a depressed position in response to movement of the lever toward the second position.

In some examples, the lip is to release the tab of the cable connector positioned in the connector cavity in response to movement of the lever toward the first position.

In some examples, the lever rotates about a pivot axis positioned adjacent the connector cavity, wherein the pivot axis is non-parallel relative to a longitudinal axis of the carrier.

In some examples, the handle and the lip rotate away from the carrier when the lever rotates about the pivot axis in a first rotational direction.

In some examples, the apparatus includes means for supporting a cable, the means for supporting the cable having means for receiving a connector and means for receiving a cord. The apparatus includes means for depressing a tab of a connector pivotally coupled to the means for supporting the cable, the means for depressing the tab to align with the means for receiving the connector, the means for depressing the tab to move relative the means for supporting the cable between a first position to depress a tab of the connector and a second position to release the tab of the connector, and means for pivotally coupling the means for depressing the tab and the means for supporting the cable.

In some examples, the means for depressing the tab is configured to rotate relative to the means for supporting the cable between the first position to cause the means for depressing the tab to move in a direction away from the means for receiving the connector and the second position to cause the means for depressing the tab to move toward the means for receiving the connector.

In some examples, the means for supporting the cable includes means for retaining to retain the connector within the means for receiving the connector when the connector is positioned in the means for receiving the connector.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:
1. An apparatus comprising:
a cable carrier having a connector cavity to receive a connector of a cable; and
a lever having a tab depressor pivotally coupled to the cable carrier about a pivot axis, the lever to move the tab depressor relative to the connector cavity of the cable carrier, the pivot axis positioned between the connector cavity and a cord cavity of the cable carrier, wherein the lever includes a body defining the tab depressor at a first end of the body and a handle at a second end of the body opposite the first end, and wherein the handle extends along a first surface of the cable carrier and the tab depressor extends along a second surface of the cable carrier opposite the first surface.

2. The apparatus of claim 1, wherein the tab depressor includes a lip positioned in alignment with the connector cavity of the carrier.

3. The apparatus of claim 1, wherein the cable carrier includes a tapered wall adjacent the connector cavity structured to engage at least a portion of the connector when the connector is positioned in the connector cavity.

4. The apparatus of claim 1, wherein the cable carrier includes a slot to define the connector cavity.

5. The apparatus of claim 4, wherein the slot further defines the cord cavity to receive a cord of the cable.

6. The apparatus of claim 5, wherein the slot includes a first width defining the connector cavity, a second width defining the cord cavity, and a transition having a varying third width between the connector cavity and the cord cavity, the first width being greater than the second width.

7. The apparatus of claim 5, wherein the slot is formed along a longitudinal axis of the carrier.

8. The apparatus of claim 7, wherein a first side wall and a second side wall of the cable carrier include openings to receive the cord of the cable, the openings being non-parallel relative to the longitudinal axis of the carrier.

9. The apparatus of claim 1, wherein the first surface is a bottom surface and the second surface is an upper surface.

10. An apparatus comprising:
a cable carrier having a connector cavity to receive a connector of a cable and a cord cavity to receive a cord of the cable; and
a lever pivotally coupled to the cable carrier about a pivot axis and configured to rotate relative to the carrier between a first position to cause a lip of the lever to move in a direction away from the connector cavity and a second position to cause the lip to move toward the connector cavity, the pivot axis positioned between the connector cavity and the cord cavity, wherein the lever has a first portion including a handle positioned on a first side of the cable carrier and a second portion including the lip positioned along a second side of the cable carrier opposite the first side, and wherein the lip extends from a support wall that encloses at least a portion of the connector cavity.

11. The apparatus of claim 10, wherein the lip is to move a tab of the connector located in the connector cavity to a depressed position in response to movement of the lever toward the second position.

12. The apparatus of claim 11, wherein the lip is to release the tab of the cable connector positioned in the connector cavity in response to movement of the lever toward the first position.

13. The apparatus of claim 10, wherein the lever rotates about a pivot axis positioned adjacent the connector cavity, wherein the pivot axis is non-parallel relative to a longitudinal axis of the carrier.

14. The apparatus of claim 13, wherein the handle and the lip rotate away from the carrier when the lever rotates about the pivot axis in a first rotational direction.

15. The apparatus of claim 10, wherein the handle extends underneath the cable carrier and the lip extends above the cable carrier.

16. An apparatus comprising:
means for supporting a cable, the means for supporting the cable having means for receiving a connector and means for receiving a cord;
means for depressing a tab of a connector, the means for depressing the tab pivotally coupled to the means for supporting the cable, the means for depressing the tab to align with the means for receiving the connector, the means for depressing the tab to move relative the means for supporting the cable between a first position to depress a tab of the connector and a second position to release the tab of the connector; and
means for pivotally coupling the means for depressing the tab and the means for supporting the cable about a pivot axis positioned between the means for receiving the connector and the means for receiving the cord,
wherein the means for pivotally coupling has a first portion including a means for moving and a second portion including a means for positioning, the means for moving extending along the means for supporting the cable and the means for positioning extending along the means for supporting the cable,
wherein the means for positioning extends from a second means for supporting that encloses at least a portion of the means for receiving a connector.

17. The apparatus of claim 16, wherein the means for depressing the tab is configured to rotate relative to the means for supporting the cable between the first position to cause the means for depressing the tab to move in a direction away from the means for receiving the connector and the second position to cause the means for depressing the tab to move toward the means for receiving the connector.

18. The apparatus of claim 17, wherein the means for supporting the cable includes means for retaining to retain the connector within the means for receiving the connector when the connector is positioned in the means for receiving the connector.

* * * * *